(12) United States Patent
Okunaka

(10) Patent No.: US 10,843,437 B2
(45) Date of Patent: Nov. 24, 2020

(54) CARBON-FIBER-REINFORCED THERMOPLASTIC-RESIN COMPOSITE MATERIAL AND MOLDED BODY USING THE SAME

(71) Applicant: Mitsubishi Chemical Corporation, Tokyo (JP)

(72) Inventor: Osamu Okunaka, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 322 days.

(21) Appl. No.: 14/771,990

(22) PCT Filed: Mar. 6, 2014

(86) PCT No.: PCT/JP2014/055777
§ 371 (c)(1),
(2) Date: Sep. 1, 2015

(87) PCT Pub. No.: WO2014/136876
PCT Pub. Date: Sep. 12, 2014

(65) Prior Publication Data
US 2016/0009054 A1 Jan. 14, 2016

(30) Foreign Application Priority Data

Mar. 7, 2013 (JP) .................................. 2013-045374

(51) Int. Cl.
*B32B 5/26* (2006.01)
*C08J 5/04* (2006.01)
*C08J 5/24* (2006.01)

(52) U.S. Cl.
CPC ................. *B32B 5/26* (2013.01); *C08J 5/042* (2013.01); *C08J 5/24* (2013.01); *B32B 2260/023* (2013.01);
(Continued)

(58) Field of Classification Search
CPC ................ B32B 5/26; B32B 2260/023; B32B 2260/046; B32B 2262/106;
(Continued)

(56) References Cited

U.S. PATENT DOCUMENTS

| 2010/0028616 A1* | 2/2010 | Yamanouchi | ............. C08J 5/24 428/172 |
| 2010/0068518 A1* | 3/2010 | Honma | ...................... C08J 5/24 428/401 |

(Continued)

FOREIGN PATENT DOCUMENTS

| EP | 2 067 615 A1 | 6/2009 | |
| EP | 2067615 A1 * | 6/2009 | ............... B32B 1/00 |

(Continued)

OTHER PUBLICATIONS

JP-2007261141-A Translation.*

(Continued)

*Primary Examiner* — Travis M Figg
(74) *Attorney, Agent, or Firm* — Oblon, McClelland, Maier & Neustadt, L.L.P.

(57) ABSTRACT

The invention is intended to obtain a composite material suitable for mass production or the like by shortening the molding time while obtaining the advantages of the composite materials described above, and intended to provide a composite material which has a short molding time by the use of a thermoplastic resin as a matrix and is excellent in balance among stiffness, strength, and thermal conductivity. A carbon-fiber-reinforced thermoplastic-resin composite material comprising: a layer (I) containing a carbon fiber (A) aligned in one direction and a thermoplastic resin (C-1); and a layer (II) containing a carbon fiber (B) aligned in one (Continued)

direction and a thermoplastic resin (C-2), wherein the carbon fiber (A) has a higher elastic modulus than the carbon fiber (B).

18 Claims, 3 Drawing Sheets

(52) U.S. Cl.
CPC ... *B32B 2260/046* (2013.01); *B32B 2262/106* (2013.01); *B32B 2457/00* (2013.01); *C08J 2323/26* (2013.01); *C08J 2369/00* (2013.01)

(58) Field of Classification Search
CPC ......... B32B 2457/00; C08J 5/042; C08J 5/24; C08J 2323/26; C08J 2369/00
See application file for complete search history.

(56) References Cited

U.S. PATENT DOCUMENTS

| | | | | |
|---|---|---|---|---|
| 2013/0143025 | A1* | 6/2013 | Kibayashi | C08J 5/042 428/221 |
| 2014/0011006 | A1* | 1/2014 | Guinaldo Fernandez | B32B 7/05 428/201 |
| 2014/0170370 | A1* | 6/2014 | Horii | C04B 35/83 428/113 |

FOREIGN PATENT DOCUMENTS

| | | | | |
|---|---|---|---|---|
| JP | 05293919 | A | * 11/1993 | |
| JP | 07-144371 | A | 6/1995 | |
| JP | 08-118527 | A | 5/1996 | |
| JP | 2554821 | B | 11/1996 | |
| JP | 11-170478 | A | 6/1999 | |
| JP | 2005-014449 | A | 1/2005 | |
| JP | 2007-000528 | A | 1/2007 | |
| JP | 2007000528 | A | * 1/2007 | |
| JP | 2007-261141 | A | 10/2007 | |
| JP | 2007261141 | A | * 10/2007 | ............. B29B 15/08 |
| JP | 2009-096859 | A | 5/2009 | |
| JP | 4324649 | B | 9/2009 | |
| JP | 2010-229238 | A | 10/2010 | |
| WO | WO-2013015101 | A1 | * 1/2013 | ............. C04B 35/83 |

OTHER PUBLICATIONS

JP-2007000528-A Translation.*
JP-05293919-A Translation.*
International Search Report dated Jun. 10, 2014 far PCT/JP2014/055777 filed on Mar. 6, 2014.
Third Party Observation submitted on Mar. 11, 2014 for PCT/JP2014/055777 filed on Mar. 6, 2014.

* cited by examiner

CARBON-FIBER-REINFORCED THERMOPLASTIC-RESIN COMPOSITE MATERIAL AND MOLDED BODY USING THE SAME

TECHNICAL FIELD

The present invention relates to a carbon-fiber-reinforced thermoplastic-resin composite material and a molded body which are excellent in balance between stiffness and strength.

This application is based upon and claims the benefit of priority of the prior Japanese Patent Application No. 2013-45374, filed on Mar. 7, 2013, the entire contents of which are incorporated herein by reference.

BACKGROUND ART

Carbon fiber composite materials, particularly carbon fiber-reinforced plastics (CFRP) are utilized in an aircraft, an automobile, sports, leisure and other various industrial applications since they have features of a light weight and a high strength. In addition, the carbon fiber composite materials exhibit characteristic anisotropic luster due to the orientation of the carbon fiber bundles constituting them, have a deep and profound appearance by performing a treatment such as coating on their surface, and have features such as electrical conductivity, radiolucency, and electromagnetic wave shielding property. Generally, the carbon fiber composite materials are utilized in various industrial applications in the form of a layered plate, a honeycomb sandwich plate or the like. However, a thermosetting resin is used in most of them as a matrix, and thus a method, which requires a relatively long molding time involving the hardening reaction of the resin, namely, is typified by autoclave molding, and is not suitable for mass production, is used in order to mold these.

Meanwhile, a number of composite materials using a thermoplastic resin as a matrix and molded articles thereof are also proposed. For example, a prepreg composed of reinforced fibers pulled and aligned in one direction and a thermoplastic resin and structural materials using the prepreg are proposed in the technique disclosed in Patent Document 1.

In addition, in Patent Document 2, a carbon fiber-reinforced resin composite material formed by combining a unidirectional prepreg composed of a specific pitch-based carbon fiber (A) and a unidirectional prepreg composed of a carbon fiber (B) that is a polyacrylonitrile-based carbon fiber, layering, and molding is proposed, and a thermosetting epoxy resin is used as a matrix resin in Examples.

CITATION LIST

Patent Document

Patent Document 1: JP 4324649 B1
Patent Document 2: JP 2554821 B1

DISCLOSURE OF THE INVENTION

Problem to be Solved by the Invention

The invention is made in view of the background described above and intended to obtain a composite material suitable for mass production or the like by shortening the molding time while obtaining the advantages of the composite materials described above. In other words, the invention is intended to provide a composite material which has a short molding time by the use of a thermoplastic resin as a matrix and is excellent in balance among stiffness, strength, and thermal conductivity.

Means for Solving Problem

The above object of the invention is achieved by the respective aspects of the invention to be described below.

(1) A carbon-fiber-reinforced thermoplastic-resin composite material including a layer (I) containing a carbon fiber (A) aligned in one direction and a thermoplastic resin (C-1) and a layer (II) containing a carbon fiber (B) aligned in one direction and a thermoplastic resin (C-2), in which the carbon fiber (A) has a higher elastic modulus than the carbon fiber (B).

(2) The carbon-fiber-reinforced thermoplastic-resin composite material according to (1), in which an elastic modulus of the carbon fiber (A) is 350 GPa or more and an elastic modulus of the carbon fiber (B) is 200 GPa or more and less than 350 GPa.

(3) The carbon-fiber-reinforced thermoplastic-resin composite material according to (1) or (2), in which the layer (I) accounts for ⅓ or less of a thickness of the carbon-fiber-reinforced thermoplastic-resin composite material.

(4) The carbon-fiber-reinforced thermoplastic-resin composite material according to any one of (1) to (3), in which the layer (I) accounts for ⅓ or more of a thickness of a region which accounts for 10% of a thickness of the carbon-fiber-reinforced thermoplastic-resin composite material from a surface of at least one side of the carbon-fiber-reinforced thermoplastic-resin composite material.

(5) The carbon-fiber-reinforced thermoplastic-resin composite material according to (4), in which the layer (I) accounts for ⅓ or more of each of thicknesses of regions which account for 10% of a thickness of the carbon-fiber-reinforced thermoplastic-resin composite material from surfaces of both sides of the carbon-fiber-reinforced thermoplastic-resin composite material.

(6) The carbon-fiber-reinforced thermoplastic-resin composite material according to any one of (1) to (5), in which the carbon fiber (B) is a polyacrylonitrile-based carbon fiber.

(7) The carbon-fiber-reinforced thermoplastic-resin composite material according to any one of (1) to (5), in which the carbon fiber (A) is a pitch-based carbon fiber.

(8) The carbon-fiber-reinforced thermoplastic-resin composite material according to any one of (1) to (5), in which the carbon fiber (A) is a pitch-based carbon fiber and the carbon fiber (B) is a polyacrylonitrile-based carbon fiber.

(9) The carbon-fiber-reinforced thermoplastic-resin composite material according to any one of (1) to (8), in which a thickness of the layer (I) is from 0.1 to 0.3 mm.

(10) The carbon-fiber-reinforced thermoplastic-resin composite material according to any one of (1) to (9), in which a thermal conductivity of the carbon fiber (A) is 20 W/mK or more and 600 W/mK or less and a thermal conductivity of the carbon fiber (B) is 3 W/mK or more and less than 20 W/mK.

(11) The carbon-fiber-reinforced thermoplastic-resin composite material according to any one of (1) to (10), in which the carbon fiber (A) is a continuous carbon fiber and an average fiber length of the carbon fiber (B) is from 10 to 50 mm.

(12) The carbon-fiber-reinforced thermoplastic-resin composite material according to any one of (1) to (11), in which an elastic modulus after applying a load corresponding to 70% of the maximum load to the carbon-fiberreinforced thermoplastic-resin composite material is from 20 to 60% of an elastic modulus before applying the load in a three-point bending test.

(13) The carbon-fiber-reinforced thermoplastic-resin composite material according to any one of (1) to (12), in which an equivalent stiffness weight that is the weight of a sample plate having a size of 200 mm×320 mm when a shift of a region to which a load of 10 N is applied in the case of applying the load to a substantially central portion of the sample plate is 0.88 mm is from 80 to 92 g.

(14) The carbon-fiber-reinforced thermoplastic-resin composite material according to any one of (1) to (13), in which at least one layer of the layer (II) is sandwiched between at least two layers of the layer (I).

(15) The carbon-fiber-reinforced thermoplastic-resin composite material according to (14), in which two or more layers of the layer (II) are sandwiched between at least two layers of the layer (I).

(16) The carbon-fiber-reinforced thermoplastic-resin composite material according to any one of (1) to (15), in which the layer (I) and the layer (II) are overlapped, and fiber directions of carbon fibers contained in respective two layers consisting of the layer (I) and the layer (II) which are directly overlapped are substantially orthogonal to each other.

(17) A molded body obtained by thermoforming the carbon-fiber-reinforced thermoplastic-resin composite material according to any one of (1) to (16).

(18) The molded body according to (17), having a convex portion having a height of 3 mm or more on a surface of either side.

(19) A member for electronic device housing including the molded body according to (17) or (18).

Another concept of the invention has the following aspects.

(20) A carbon-fiber-reinforced thermoplastic-resin composite material including a layer containing a pitch-based carbon fiber (A1) arranged in one direction and a thermoplastic resin (C-1) and a layer containing a polyacrylonitrile-based carbon fiber (B1) arranged in one direction and a thermoplastic resin (C-2).

(21) A molded body including the composite material according to (20).

(22) A method of manufacturing the composite material according to (20) including layering a thermoplastic prepreg composed of a pitch-based carbon fiber (A1) arranged in one direction and a thermoplastic resin (C-1) and a thermoplastic prepreg composed of a polyacrylonitrile-based carbon fiber (B1) arranged in one direction and a thermoplastic resin (C-2) in combination.

Effect of the Invention

According to the invention, it is possible to obtain a molded body excellent in balance among stiffness, strength, and thermal conductivity in a short molding time.

MODE(S) FOR CARRYING OUT THE INVENTION

Hereinafter, the invention will be specifically explained with reference to embodiments.

The carbon-fiber-reinforced thermoplastic-resin composite material according to the present embodiment includes a layer (I) containing a carbon fiber (A) aligned in one direction and a thermoplastic resin (C-1) and a layer (II) containing a carbon fiber (B) which has a lower elastic modulus than the carbon fiber (A) and is aligned in one direction, and a thermoplastic resin (C-2).

Figure 1:
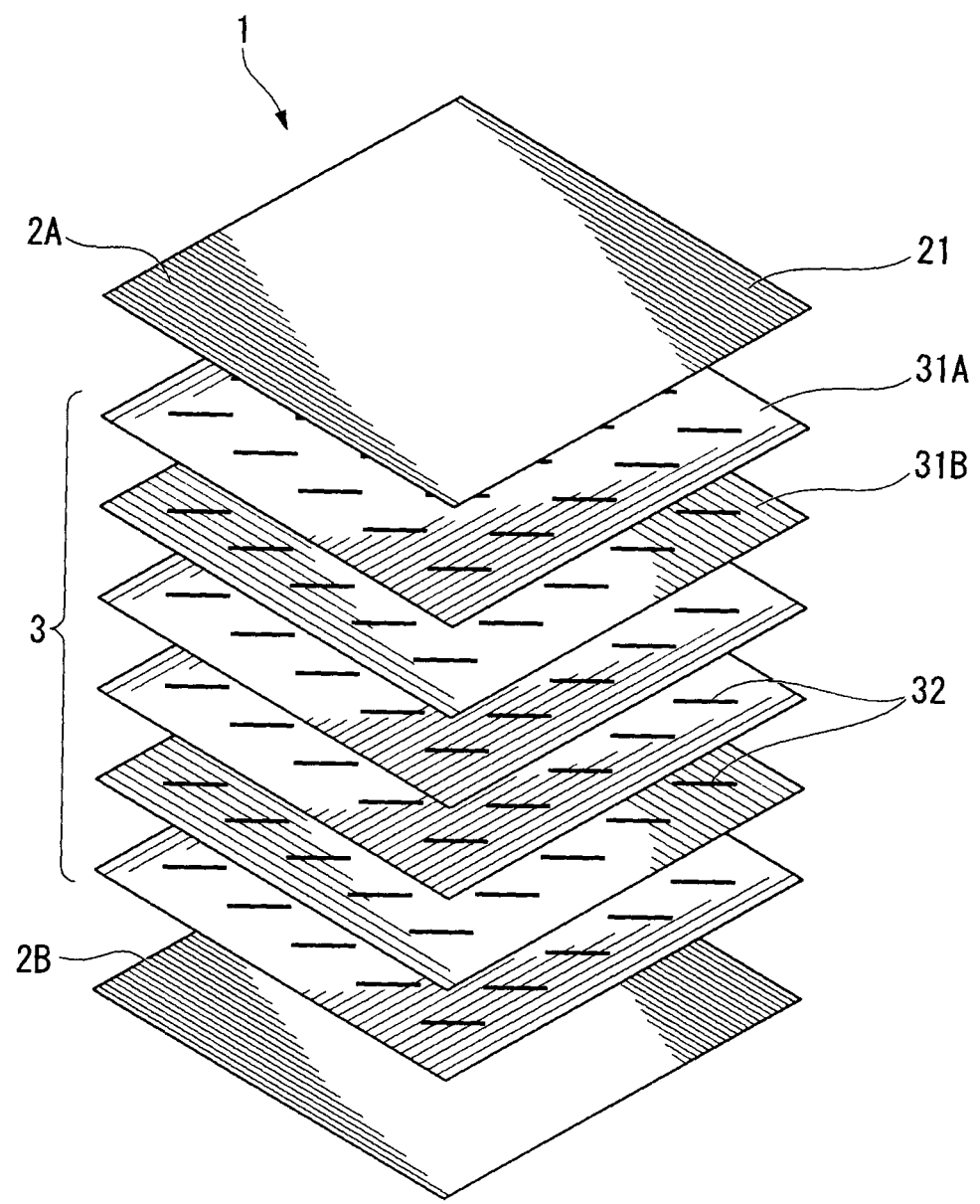
FIG. 1 is a schematic perspective view illustrating a carbon-fiber-reinforced thermoplastic-resin composite material according to an embodiment of the invention.

In the present embodiment, a carbon-fiber-reinforced thermoplastic-resin composite material 1 is equipped with layers (I) 2A and 2B and a layer (II) 3 as illustrated in FIG. 1. In the example illustrated in the drawing, the surface of both sides of the carbon-fiber-reinforced thermoplastic-resin composite material 1 is equipped with the layers (I) 2A and 2B and two or more (six layers in the example illustrated in the drawing) layers (II) 3 are sandwiched between the layers (I) 2A and 2B.

Hereinafter, the configuration of the respective layers will be explained.

(Layer (I))

The layer (I) contains a carbon fiber (A) aligned in one direction and a thermoplastic resin (C-1). In the present embodiment, to be aligned in one direction is that the longitudinal directions of the fibers are substantially parallel in a material composed of a fiber such as a carbon fiber. Specifically, to be substantially parallel is that the longitudinal directions of from 90 to 100% of the fibers which are contained in the layer such as the layer (I) and the layer (II) and will be described later are within a range of from −5° to +5°, and preferably the longitudinal directions of from 95 to 100% of the carbon fibers contained in the layer is within a range of −2° to +2°.

Particularly in the present embodiment, it is preferable that the directions are substantially aligned by applying tension to the fiber bundle prepared by combining the fibers together (this state is referred to that the fibers are pulled and aligned in one direction) in the method of manufacturing a prepreg to be described later.

As the carbon fiber (A) which can be used in the carbon-fiber-reinforced thermoplastic-resin composite material of the present embodiment, a carbon fiber having a higher elastic modulus than the carbon fiber (B) to be described later is used. The carbon-fiber-reinforced thermoplastic-resin composite material of the present embodiment exhibits an effect of being excellent in balance between elastic modulus and strength as a layer having a higher elastic modulus and a layer having a lower elastic modulus and a higher strength are layered. Here, the elastic modulus of the carbon fiber is the tensile modulus of the carbon fiber measured by the B method in conformity with JIS R7608: 2007 (ISO16018: 2004).

The elastic modulus of the carbon fiber (A) is preferably 350 GPa or more. In addition, the elastic modulus of the carbon fiber (A) is more preferably 400 GPa or more and even more preferably 600 GPa or more. The use of such a carbon fiber makes it possible to effectively exert the effect of the present embodiment. The upper limit of the tensile modulus is not substantially defined, the effect of the present embodiment is more effectively exerted as the elastic modulus is higher, but the upper limit is 900 GPa or less as a reference. The elastic modulus of the carbon fiber (A) may be selected depending on the circumstances of design and manufacture, and the like. In addition, the strength (tensile strength) of the carbon fiber (A) is preferably 2000 MPa or more. Here, the strength of the carbon fiber is the tensile strength measured in conformity with JIS R7608: 2007 (ISO16018: 2004).

The carbon fiber (A) used in the carbon-fiber-reinforced thermoplastic-resin composite material of the present embodiment is preferably a pitch-based carbon fiber. Here, to be a pitch-based carbon fiber means to be a fiber assembly constituted by "a filament fiber which is produced by spinning a resin that is produced by processing mesophase pitch, namely, petroleum tar, coal tar or the like and partially has a crystalline structure or mesophase pitch that is artificially synthesized, infusibilizing, and further carbonizing, has a graphite crystal structure that is highly developed in fiber axis direction, and is substantially composed of only carbon" as a main component. The pitch-based carbon fiber has an advantage that the elastic modulus is high and the thermal expansion is small. Furthermore, as to be described later, the carbon-fiber-reinforced thermoplastic-resin composite material of the present embodiment has a high flexural modulus and a high flexural strength as a pitch-based carbon fiber is used as the carbon fiber (A) of the layer (I) and a polyacrylonitrile-based carbon fiber is used as the carbon fiber (B) of the layer (II) in conjunction with this. It is even more preferable that the carbon fiber (A) is substantially a fiber assembly constituted by only "a filament fiber which is produced by spinning a resin that is produced by processing mesophase pitch, namely, petroleum tar, coal tar or the like and partially has a crystalline structure or mesophase pitch that is artificially synthesized, infusibilizing, and further carbonizing, has a graphite crystal structure that is highly developed in fiber axis direction, and is substantially composed of only carbon".

In the carbon fiber (A), the thermal conductivity in the longitudinal direction of the fiber is preferably 20 W/mK or more and 600 W/mK or less. As the thermal conductivity is in this range, an effect is exhibited that the heat applied to a part of the layer (I) easily diffuses in the longitudinal direction of the fiber of the carbon fiber (A) contained in the layer (I). Here, the thermal conductivity is defined as the magnitude of the heat flux per temperature gradient generating along the temperature gradient and is a value measured by a method such as a laser flash method, a steady-state heat flux method, and a hot wire method.

In addition, the breaking elongation of the carbon fiber (A) is preferably 1.5% or less and even more preferably 1.0% or less. It is possible to industrially manufacture the carbon fiber when the breaking elongation thereof is in this range. The breaking elongation of the carbon fiber referred to here is a value obtained by dividing the strength of the carbon fiber by the elastic modulus of the carbon fiber. The breaking elongation of the carbon fiber (A) may be value of 0.3% or more as a reference.

The diameter of the carbon fiber (A) is preferably 4 μm or more and 15 μm or less when the maximum Feret diameter of the filament fiber constituting the carbon fiber (A) is adopted as the diameter of the carbon fiber (A). The diameter is even more preferably 7 μm or more and 11 μm or less. It is disadvantageous in handling of the carbon fiber when the diameter exceeds 15 μm and it is difficult to produce the carbon fiber when the diameter is less than 4 μm.

The length of the longitudinal direction of the filament fiber constituting the carbon fiber (A) is preferably 2 mm or longer and more preferably 10 mm or more. There is a case in which sufficient stiffness (here, the stiffness mainly refers to one represented by the equivalent stiffness weight to be described later as a reference), strength, and thermal conductivity are not obtained in a case in which the filament fiber constituting the carbon fiber (A) is too short. In addition, the length is preferably 50 mm or shorter as a reference in a case in which the carbon fiber (A) is not a continuous fiber.

The carbon fiber (A) is preferably a continuous carbon fiber. To be a continuous carbon fiber is defined as a state in which a filament fiber constituting the carbon fiber is substantially continuous from one end portion to the other end portion of the composite material.

The form of the carbon fiber (A) may be any form as long as it is the form described above, and for example, the carbon fiber (A) may be in the form of a needle or a thread and aligned in one direction in the layer (I). In the present embodiment, the filament fiber constituting the carbon fiber (A) is the so-called thread having a diameter of about 4 μm or longer and 15 μm or less and a length of 1 mm or more, pulled and aligned in one direction, and planarly arranged as to be described later in another section to form a prepreg. As long as the length of the filament fiber constituting the carbon fiber (A) is 1 mm or longer, it is more desirable as the length is longer but the length is limited by the maximum length from one end portion to the other end portion of the composite material.

Examples of the commercially available product that is suitably used as the carbon fiber (A) having the properties as described above may include DIALEAD (registered trademark) K1352U, K1392U, K13C2U, K13D2U, K13312, K63712, and K63A12 (trade names, manufactured by Mitsubishi Plastics, Inc.).

In the carbon-fiber-reinforced thermoplastic-resin composite material according to the present embodiment, the layer (I) contains a thermoplastic resin (C-1).

Examples of a thermoplastic resin that can be used as the thermoplastic resin (C-1) according to the present embodiment may include a styrene-based resin such as polystyrene, a (meth)acrylic acid ester/styrene copolymer, an acrylonitrile/styrene copolymer, a styrene/anhydrous maleic acid copolymer, ABS, ASA or AES; an acrylic resin such as polymethyl methacrylate; a polycarbonate-based resin; a polyamide-based resin; a polyester-based resin such as polyethylene terephthalate or polybutylene terephthalate; a polyphenylene ether-based resin; a polyoxymethylene-based resin; a polysulfone-based resin; a polyarylate-based resin; a polyphenylene sulfide-based resin; a thermoplastic polyurethane-based resin; a polyolefin-based resin such as polyethylene, polypropylene, polybutene, poly-4-methylpentene, an ethylene/propylene copolymer or an ethylene/butene copolymer; a copolymer of an α-olefin with various monomers such as an ethylene/vinyl acetate copolymer, an ethylene/(meth)acrylic acid ester copolymer, an ethylene/anhydrous maleic acid copolymer or an ethylene/acrylic acid copolymer; an aliphatic polyester-based resin such as polylactic acid, polycaprolactone or an aliphatic glycol/aliphatic dicarboxylic acid copolymer; or a biodegradable resin such as biodegradable cellulose, a polypeptide, polyvinyl alcohol, starch, carrageenan or chitin and chitosan-like resin. From the viewpoint of strength and workability, a crystalline resin is preferable and polypropylene or a polyamide-based resin is even more preferable. It is possible to blend various kinds of resin additives into the thermoplastic resin (C-1) if necessary. Examples of the resin additive may include a colorant, an antioxidant, a metal deactivator, carbon black, a nucleating agent, a mold releasing agent, a lubricant, an antistatic agent, a light stabilizer, an ultraviolet absorber, an impact modifier, a melt tension improver or a flame retardant.

In the layer (I) that can be used in the carbon-fiber-reinforced thermoplastic-resin composite material of the present embodiment and contains the carbon fiber (A) aligned in one direction and the thermoplastic resin (C-1), for example, the carbon fiber (A) may be dispersed in the thermoplastic resin (C-1) while being aligned in one direction or the thermoplastic resin (C-1) may be filled in the gap between the carbon fibers (A) aligned. In the present embodiment, a layer formed by impregnating the carbon fiber (A) that is pulled and aligned in one direction and planarly arranged with the thermoplastic resin (C-1) is preferably a sheet-like prepreg.

The content proportion of the carbon fiber contained in the layer (I) is preferably from 25 to 65% by volume and even more preferably from 30 to 60% by volume with respect to the entire volume of the layer (I). It is possible to obtain a molded body excellent in balance among stiffness, strength, and thermal conductivity as the content proportion is within this range. The thickness of the layer (I) is not particularly limited, but it is preferably from 50 to 300 μm and even more preferably from 100 to 200 μm from the viewpoint of being equipped with both shaping property and a strength improving effect.

(Layer (II))

In the carbon-fiber-reinforced thermoplastic-resin composite material of the present embodiment, the layer (II) contains a carbon fiber (B). The carbon fiber (B) is aligned in one direction as described above.

The elastic modulus of the carbon fiber (B) is preferably 200 GPa or more and less than 350 GPa. In this case, the layer (I) and the layer (II) can keep a balance between the elastic modulus and the strength when the elastic modulus of the carbon fiber (A) is 350 GPa or more as described above. More specifically, it is possible to increase both the compressive strength and the maximum compressive strain of the unidirectionally reinforced CFRP that is the carbon-fiber-reinforced thermoplastic-resin composite material of the present embodiment to be higher than the compressive strength and the maximum compressive strain of the unidirectionaly reinforced CFRP using only the carbon fiber (A) as the reinforcing fiber. Here, the compressive strength of the unidirectionally reinforced CFRP is defined as the maximum compressive stress applied to the specimen during the compression test and is the compressive strength measured in conformity with JIK7076: 1991 (in-plane compression test method of carbon fiber reinforced plastic). The maximum compressive strain is defined as the compressive strain corresponding to the compressive strength and is the maximum compressive strain also measured in conformity with JIK7076. More specific values of the elastic modulus and strength of the carbon fiber (A) and the carbon fiber (B) are particularly preferably determined from a balance between the compressive strength and the maximum compressive strain of the unidirectionally reinforced CFRP that is the carbon-fiber-reinforced thermoplastic-resin composite material of the present embodiment. Specifically, the unidirectionally reinforced CFRP using only the carbon fiber (B) as the reinforcing fiber and the unidirectionally reinforced CFRP using only the carbon fiber (A) as the reinforcing fiber are in a relationship that the compressive strength and the maximum compressive strain of the unidirectionally reinforced CFRP using only the carbon fiber (B) as the reinforcing fiber are 1.5 times or more compared to those of the unidirectionally reinforced CFRP using only the carbon fiber (A) as the reinforcing fiber.

The carbon fiber (B) of the present embodiment is preferably a polyacrylonitrile-based carbon fiber. Here, to be a polyacrylonitrile-based carbon fiber means to be a fiber assembly constituted by "a filament fiber which is produced by infusibilizing a fiber composed of a polyacrylonitrile-based resin prepared by polymerizing acrylonitrile as a main component and further carbonizing and is substantially composed of only carbon" as a main component. The polyacrylonitrile-based carbon fiber has an advantage of a low density and a high specific strength. At this time, the carbon-fiber-reinforced thermoplastic resin composite material of the present embodiment has a high flexural modulus and a high flexural strength in the case of using a pitch-based carbon fiber as the carbon fiber (A) described above. It is even more preferable that the carbon fiber (B) is substantially a fiber assembly constituted by only "a filament fiber which is produced by infusibilizing a fiber composed of a polyacrylonitrile-based resin prepared by polymerizing acrylonitrile as a main component and further carbonizing and is substantially composed of only carbon".

The form of the carbon fiber (B) may be any form as long as it is in the form described in the above carbon fiber (A), and for example, the carbon fiber (B) may be in the form of a needle or a thread and aligned in one direction in the layer (II).

When the maximum Feret diameter of the filament fiber constituting the carbon fiber (B) of the present embodiment is adopted as the diameter of the carbon fiber (B), it is preferable that the diameter of the carbon fiber (B) is smaller than the diameter of the carbon fiber (A). The diameter of the carbon fiber (B) is preferably 1 μm or more and 20 μm or less, even more preferably 4 μm or more and 15 μm or less, and even more preferably 5 μm or more and 8 μm or less.

The fiber length of the filament fiber constituting the carbon fiber (B) is 1 mm or longer. Furthermore, the fiber length is preferably 2 mm or longer and even more preferably 10 mm or longer. There is a case where sufficient stiffness and a sufficient strength are not obtained in a case in which the filament fiber constituting the carbon fiber (B) is too short. In addition, the average fiber length of the filament fiber constituting the carbon fiber (B) is 100 mm or shorter and even more preferably 50 mm or shorter as a reference in a case in which the carbon fiber (B) is not a continuous fiber in particular. Here, the average fiber length is a value determined by a method in which the length of the filament fibers constituting the carbon fiber is measured respectively using an optical microscope or the like and the sum of the squares of the fiber lengths of the respective filament fibers is divided by the sum of the fiber lengths of the respective filament fibers.

The thermal conductivity of the carbon fiber (B) is preferably 3 W/mK or more and less than 20 W/mK. As the thermal conductivity is in this range, an effect is exhibited that the heat applied to a part of the layer (II) easily diffuses in the longitudinal direction of the fiber of the carbon fiber (B) contained in the layer (II).

A commercially available product may be used as the carbon fiber (B), and examples thereof may include PYROFIL (registered trademark) TR30S 3L, TR50S 6L, TRH50 12L, TRH50 18M, TR50S 12L, TR50S 15L, MR40 12M, MR60H 24P, MS40 12M, HR40 12M, HS40 12P, P330 60K, and WCF 50K (product names, manufactured by Mitsubishi Rayon Co., Ltd.).

In the carbon-fiber-reinforced thermoplastic-resin composite material of the present embodiment, the layer (II) contains a thermoplastic resin (C-2).

The thermoplastic resin (C-2) of the present embodiment may be selected from those exemplified as the thermoplastic resin which can be used in the thermoplastic resin (C-1) described above or may be a resin different from the thermoplastic resin (C-1). However, it is preferable to select one so that the combination of the thermoplastic resin (C-1) and the thermoplastic resin (C-2) exhibit excellent compatibility. As the combination exhibiting excellent compatibility, a combination having a difference in solubility parameter (SP value) of 1.0 $(J/cm^3)^{0.5}$ or less is mentioned. The solubility parameter can be determined by a method of Fedors, Van Krevelen, or the like, and any method can be used. In addition, in the case of using a copolymer such as a block copolymer or a graft copolymer as the thermoplastic resin, excellent compatibility is exhibited when a difference in solubility parameter among any partial structures of the respective copolymers is 1.0 $(J/cm^3)^{0.5}$ or less.

In addition, it is even more preferable to use the same compound as the thermoplastic resin (C-1) as the thermoplastic resin (C-2) of the present embodiment.

In the layer (II) that can be used in the carbon-fiber-reinforced thermoplastic-resin composite material of the present embodiment and contains the carbon fiber (B) aligned in one direction and the thermoplastic resin (C-2), for example, the carbon fiber (B) may be dispersed in the thermoplastic resin (C-2) while being aligned in one direction or the thermoplastic resin (C-2) may be filled in the gap between the carbon fibers (B) aligned. In the present embodiment, the layer (II) is preferably a sheet-like prepreg formed by impregnating the carbon fiber (B) that is pulled and aligned in one direction and planarly arranged with the thermoplastic resin (C-2).

The content proportion of the carbon fiber contained in the layer (II) is preferably from 25 to 65% by volume and even more preferably from 30 to 60% by volume with respect to the entire volume of the layer (II). It is possible to obtain a molded body excellent in balance among stiffness, strength, and thermal conductivity as the content proportion is within this range. The thickness of the layer (II), namely, the length in a direction overlapping another layer is not particularly limited, but it is preferably from 50 to 300 μm and even more preferably from 100 to 200 μm from the viewpoint of being equipped with both shaping property and a strength improving effect.

A layer (II) of the present embodiment may have a slit on the surface. The slit is a structure having a notch shape and a depth penetrating the thickness of each layer in a direction transverse to the reinforcing fiber of the layer. The slit may be provided to cut the reinforcing fiber of each layer. The length of the slit is preferably from 10 to 100 mm. The slit preferably has a sum of the slit lengths of 5 cm or more and 40 cm or less with respect to the surface of 5 cm×5 cm of the layer (II). The longitudinal direction of the slit is not parallel to the fiber direction of the carbon fiber (B) of the layer (II) but may be at from 30 to 60° thereto and is even more preferably at an angle of about 45° (42 to 48°) thereto. As the layer (II) has a slit, the moldability at the time of forming the carbon-fiber-reinforced thermoplastic-resin composite material into a molded body to be described later is improved and specifically, an effect that a convex portion having a height of 3 mm or more is moldable is obtained. In a case in which the reinforcing fiber is cut into shorter pieces by the slit, the reinforcing fiber easily moves together with the thermoplastic resin at the time of molding and thus the moldability of the layer (II) is enhanced.

(Structure of Carbon-Fiber-Reinforced Thermoplastic-Resin Composite Material)

The carbon-fiber-reinforced thermoplastic-resin composite material of the present embodiment includes the layer (I) and the layer (II) described above.

The carbon fiber-reinforced thermoplastic-resin composite material according to the present embodiment includes the layer (I) containing the carbon fiber (A) and the thermoplastic resin (C-1) and the layer (II) containing the carbon fiber (B) and the thermoplastic resin (C-2). It is preferable that the carbon fiber (A) is a pitch-based carbon fiber (A1) and the carbon fiber (B) is a polyacrylonitrile-based carbon fiber (B1). The pitch-based carbon fiber (A1) and the polyacrylonitrile-based carbon fiber (B1) have significantly different physical properties from each other, and thus it is possible to design a layered structure depending on the purpose. For example, a layer composed of the pitch-based carbon fiber (A1) and the thermoplastic resin (C-1) is adopted as an outer layer, and a layer composed of the polyacrylonitrile-based carbon fiber (B1) and the thermoplastic resin (C-2) is adopted as an inner layer, and thus the stiffness of the composite material is high even though the amount of the pitch-based carbon fiber (A1) used is small.

In the carbon fiber-reinforced thermoplastic-resin composite material of the present embodiment, it is preferable that the layer (I) accounts for ⅓ or less of the thickness of the carbon fiber-reinforced thermoplastic-resin composite material. When the layer (I) accounts for a thickness exceeding ⅓ of the above thickness, it is not possible to keep a balance between the elastic modulus and the strength of the carbon fiber-reinforced thermoplastic-resin composite material, and in particular the strength is insufficient although the elastic modulus is high in some cases. In particular, it is preferable that the layer (I) accounts for ¼ or less of the above thickness. For example, in a case in which the thickness of one layer of the layer (I) is equal to the thickness of one layer of the layer (II), the carbon fiber-reinforced thermoplastic-resin composite material may have a configuration including two layers of the layer (I) and six or more layers (for example, 6 to 16 layers) of the layer (II).

In the carbon fiber-reinforced thermoplastic-resin composite material of the present embodiment, it is preferable that the layer (I) accounts for ⅓ or more of the thickness of the region which accounts for 10% of the thickness of the carbon fiber-reinforced thermoplastic-resin composite material from the surface of at least one side thereof. In other words, it is not required that the outermost surface of the carbon fiber-reinforced thermoplastic-resin composite material is the layer (I), but it is preferable that the layer (I) is contained in the region of the thickness up to 10% when measured from the surface and it is preferable that the layer (I) accounts for ⅓ or more of this region. For the region close to the surface, as the layer (I) having a high elastic modulus is contained in this region and the accounting proportion thereof is ⅓ or more, the carbon fiber-reinforced thermoplastic-resin composite material can favorably exert a balance between elastic modulus and strength and becomes stronger against the impact or the like applied from the surface. The region occupied by the layer (I) is more preferably ½ or more of the region of the thickness up to the 10% and even more preferably ⅔ or more. For example, the carbon fiber-reinforced thermoplastic-resin composite material may have a configuration in which a part of the protective layer to be described later, the layer (I), and the layer (II)

in order from the surface accounts for 10% from the surface thereof, and the layer (I) accounts for ⅔ or more of the thickness among these.

In addition, in the carbon fiber-reinforced thermoplastic-resin composite material of the present embodiment, for the surfaces of both sides thereof, it is preferable that the layer (I) accounts for ⅓ or more of the thickness of the region which accounts for 10% of the thickness of the carbon fiber-reinforced thermoplastic-resin composite material described above. As the layer (I) close to the surfaces of both sides is contained in to some extent, the carbon fiber-reinforced thermoplastic-resin composite material can more favorably exert a balance between elastic modulus and strength and becomes stronger against the impact in both surfaces.

The layer (I) contained in the carbon fiber-reinforced thermoplastic-resin composite material of the present embodiment may have a shape such as a plane, a cylindrical surface, and a three-dimensional curved surface as long as it is a sheet shape having a width and a length greater than the thickness. For the size of the layer (I), the width and the length are not particularly limited depending on the application of the carbon-fiber-reinforced thermoplastic resin composite material, but the thickness is preferably from 0.1 to 0.3 mm. As the layer (I) using the carbon fiber (A) having a high elastic modulus has a thickness in this range, an elastic modulus can be favorably exerted. The shape and size of the layer (II) can be appropriately selected in the same manner as those of the layer (I) described above.

The carbon fiber-reinforced thermoplastic-resin composite material of the present embodiment preferably consists of at least one layer of the layer (II) sandwiched between at least two layers of the layer (I). In particular, it preferably consists of two or more layers of the layer (II) sandwiched between the layers (I). As a plurality of layers (II) are sandwiched between the layers (I) of both surfaces, the carbon fiber reinforced thermoplastic resin composite material is equipped with a high strength caused by the layer (II), the high stiffness caused by the layer (I) is exhibited on surface of this material as well, and also the material is hardly damaged by the impact applied from the surface. In the example illustrated in the drawing, six layers of the layer (II) 3 are sandwiched between the layers (I) 2A and 2B. In order to obtain a higher strength, the composite material may include from 7 to 18 layers, and for example, 16 layers of the layer (II).

Incidentally, in addition to this, the configuration of the layer (1) and the layer (II) in the material can be determined as desired, and the entire surface may have the same layered configuration or a greater number of the layer (I) or the layer (II) may be partly layered. In addition, a configuration to layer the layer (I) or the layer (II) consisting of a continuous fiber, a configuration to layer the layer (I) or the layer (II) which is slit, or a configuration to dispose bundles consisting of the layer (I) or the layer (II) at random may be employed.

Furthermore, in the layer (I) and the layer (II) described above, it is preferable that the fiber directions of the carbon fibers of the adjacent layers are substantially orthogonal. To be substantially orthogonal is that the fibers intersect each other so as to be at approximately 90°, and specifically may be at about 85 to 95°. In the example illustrated in the drawing, the directions of the fibers 21 of the layer (I) 2A which are disposed on the upper surface of the drawing are adjacent to one another, that is, orthogonal to the directions of the fibers 31A of the layer (II) 3 directly thereunder. The directions of the fibers 31A are adjacent to one another and orthogonal to the directions of fibers 31B of the layer (II) 3 directly thereunder. The same is applied to the directions of the fibers of the following layers.

It is possible to maximally exert the strength and the elasticity with respect to the force applied from the respective bending directions as the directions of the fibers are substantially orthogonal to one another. In a case in which a plurality of the layers (II), in particular from 7 to 18 layers are layered, an effect that the strength and the elasticity are enhanced further increases as a greater number of layers of which the fiber directions of the carbon fibers of the adjacent layers are substantially orthogonal to one another. Incidentally, the fiber directions of the carbon fibers of the adjacent layers may be substantially parallel depending on the purpose, for example, in order to simplify the manufacturing process.

The carbon fiber-reinforced thermoplastic-resin composite material of the present embodiment may include a layer composed of another appropriate material in addition to the layer (I) and the layer (II). For example, the composite material may include a protective layer composed of the same material as the layer (II) on the surface of each of the layers (I) on the both surfaces described above or a protective layer composed of a coating of a resin or the like. The layer (I) is more hardly damaged by the impact or scratches applied to the surface as a protective layer is provided on the surface of the layer (I). Examples of the material of the protective layer may include a urethane paint, an acrylic paint, an acrylic resin film, a polycarbonate resin film, a nylon resin film, and a polypropylene resin film.

In addition to the protective layer, as the material of another selective layer other than the layer (I) and the layer (II), a decorative film, a conductive coating, plating and the like are mentioned.

In the carbon fiber-reinforced thermoplastic-resin composite material of the present embodiment, it is preferable that the elastic modulus of the specimen after applying a load corresponding to 70% of the maximum load thereto is from 20 to 60% of the initial elastic modulus in a three-point bending test. Here, the three-point bending test refers to the result measured by conducting a test on three-point bending in conformity with the provision of, for example, ASTM D790.

As the carbon fiber-reinforced thermoplastic-resin composite material of the present embodiment satisfies this characteristic, an effect is exhibited that the prediction of damage is facilitated. In other words, when a constant load at a degree at which the carbon fiber-reinforced thermoplastic-resin composite material is not completely destroyed, such as a load corresponding to 70% of the maximum load is applied, the layer (I) having a lower strength may be damaged first and the effect of the layer (I) having a high elastic modulus is lost, and thus the elastic modulus of the carbon fiber-reinforced thermoplastic-resin composite material decreases.

Particularly, in a case in which the layer (I) accounts for a certain thickness closet to the surface of the carbon fiber-reinforced thermoplastic-resin composite material as described above, the fact that the layer (I) closet to the surface is damaged is ascertained by observing around the surface at the time at which a constant load lower than the maximum load is applied and thus it is possible to predict the damage before the carbon fiber-reinforced thermoplastic-resin composite material is damaged by the maximum load. This makes it possible to detect a partial damage of the molded body or a part using the carbon fiber reinforced thermoplastic resin composite material, and thus it is possible to deal with it early through replacement and the like.

In the carbon fiber-reinforced thermoplastic-resin composite material of the present embodiment, it is preferable that the equivalent stiffness weight that is the weight of a sample plate having a size of 200 mm×320 mm when the shift of the region to which a load of 10 N is applied in the case of applying the load to the central portion of the sample plate is 0.88 mm is from 80 to 92 g. To be 200 mm×320 mm is, for example, to be 200 mm in 0° direction and to be 320 mm in 90° direction. It is preferable that the peripheral four sides of the sample plate are completely constrained so as not to move at the time of the measurement. The shift of the region to which a load is applied is mainly the amount of the central portion shifted in the loading direction according to the load, and it is also referred to as the deformation amount of the sample plate. The equivalent stiffness weight is determined under the qualitative constraint condition in which the direction of carbon fiber, the volume content of the carbon fiber, the resin content, and the porosity of the respective layers constituting the carbon fiber-reinforced thermoplastic-resin composite material of the sample plate are constantly maintained and also the ratio of the mass (hereinafter, referred to as FAW) of the carbon fiber contained per unit area of each layer among the layers is constantly maintained. In the present embodiment, the deformation amount when peripheral four sides of the sample plate having a size of 200 mm in 0° direction and 320 mm in 90° direction and a thickness of 1 mm are fixed (complete constraint) using the elastic modulus obtained by the three-point bending test for each of 0° direction and 90° direction of the sample plate and 10 N is loaded on the substantial center of the sample plate is calculated. The thickness at which the deformation amount is 0.88 mm is determined by utilizing the fact that the stiffness of the sample plate is proportional to the cube of the thickness under the above qualitative constraint condition, the weight of the sample plate having the thickness and dimensions of 200 mm×320 mm is calculated, and the value thus obtained is adopted as the equivalent stiffness weight. However, for convenience, 2 GPa for the shear modulus and 0.3 for the Poisson's ratio are respectively used in the calculation.

It is preferable that the equivalent stiffness weight obtained in this manner is from 80 to 92 g since the stiffness per weight of the carbon fiber-reinforced thermoplastic-resin composite material is high, that is, an effect of weight reduction is great.

The carbon fiber-reinforced thermoplastic-resin composite material of the present embodiment can be used as an intermediate material. It is possible to obtain a desired shape by heating, shaping, and cooling the composite material of the present embodiment. This process of heating, shaping, and cooling is not required to be one step, but it is also possible to form a more complicated structure by repeatedly performing the process if necessary. In addition, it is also possible to perform machine work such as machining or cutting.

The carbon fiber-reinforced thermoplastic-resin composite material of the present embodiment becomes a composite material excellent in balance among stiffness, strength, and thermal conductivity by containing both the carbon fiber (A) of the layer (I) and the carbon fiber (B) of the layer (H) which are described above. Moreover, this carbon fiber-reinforced thermoplastic-resin composite material has an advantage to be thermoformable since it contains a thermoplastic resin.

(Method of Manufacturing Carbon Fiber-Reinforced Thermoplastic-Resin Composite Material)

The method of manufacturing a carbon fiber-reinforced thermoplastic-resin composite material of the present embodiment obtains a carbon fiber-reinforced thermoplastic-resin composite material by layering a thermoplastic prepreg (I) composed of a carbon fiber (A) aligned in one direction and a thermoplastic resin (C-1) and a thermoplastic prepreg (II) composed of a carbon fiber (B) aligned in one direction and a thermoplastic resin (C-2) in combination.

In the present embodiment, it is possible to use the pitch-based carbon fiber described above as the carbon fiber (A) and the polyacrylonitrile-based carbon fiber as the carbon fiber (B).

The thermoplastic prepreg (I) that can be used in the carbon fiber-reinforced thermoplastic-resin composite material of the present embodiment may be one that contains the carbon fiber (A) and the thermoplastic resin (C-1), but it is preferably one in which the assembly of the carbon fibers (A) is impregnated with the thermoplastic resin (C-1). As the method of manufacturing the prepreg (I), for example, a method to heat and pressurize the carbon fiber (A) and the thermoplastic resin (C-1) is used. Heating and pressurizing is generally conducted at from 200 to 300° C. using an apparatus such as a heating roll or a double belt press.

More specific manufacturing method of the prepreg (I) is as follows.

(1a) a method in which a film of the thermoplastic resin (C-1) is layered on the carbon fiber (A) pulled and aligned in one direction, and the layered body is heated and pressurized, (1b) a method in which a nonwoven fabric of the thermoplastic resin (C-1) is layered on the carbon fiber (A) pulled and aligned in one direction, and the layered body is heated and pressurized, (1c) a method in which a melt of the thermoplastic resin (C-1) is coated on the carbon fiber (A) pulled and aligned in one direction, (1d) a method in which a solution of the thermoplastic resin (C-1) is coated on the carbon fiber (A) pulled and aligned in one direction and the solvent is then removed, and (1e) a method in which a commingled fiber of carbon fiber (A) and a fiber of the thermoplastic resin (C-1) is pulled and aligned in one direction, heated, and pressurized are mentioned. It is preferable to use the method of (1a), (1b) or (1c) described above from the viewpoint of balance between the productivity and the mechanical properties.

The thermoplastic prepreg (II) that can be used in the carbon fiber-reinforced thermoplastic-resin composite material of the present embodiment may be one that contains the carbon fiber (B) and the thermoplastic resin (C-2), but it is preferably one in which the assembly of the carbon fibers (B) is impregnated with the thermoplastic resin (C-2). As the method of manufacturing this prepreg (II), for example, a method to heat and pressurize the carbon fiber (B) and the thermoplastic resin (C-2) is used. The conditions at the time of heating and pressurizing are the same as the conditions for the prepreg (I) described above.

More specific manufacturing method of the prepreg (II) is as follows.

(2a) a method in which a film of the thermoplastic resin (C-2) is layered on the carbon fiber (B) pulled and aligned in one direction, and the layered body is heated and pressurized, (2b) a method in which a nonwoven fabric of the thermoplastic resin (C-2) is layered on the carbon fiber (B) pulled and aligned in one direction, and the layered body is heated and pressurized, (2c) a method in which a melt of the thermoplastic resin (C-2) is coated on the carbon fiber (B) pulled and aligned in one direction, (2d) a method in which a solution of the thermoplastic resin (C-2) is coated on the carbon fiber (B) pulled and aligned in one direction and the solvent is then removed, and (2e) a method in which a commingled fiber of carbon fiber (B) and a fiber of the thermoplastic resin (C-2) is pulled and aligned in one direction, heated, and pressurized, are mentioned. It is preferable to use the method of (2a), (2b) or (2c) described above from the viewpoint of balance between the productivity and the mechanical properties.

For example, in the method of (1a) and (2a), the operation of pulling and aligning the carbon fiber in one direction is performed by a method in which the fiber is aligned and tension is applied thereto. Specifically, a method in which the fiber bundle is wound onto a roll in a spiral shape in a state of being strained to some extent, or in which the both ends of the fiber bundle prepared by combining the fibers are fixed and tension is applied thereto, or the like is used. In this method, at the time of layering a film of the thermoplastic resin, for example, a method in which the film is pressed on the above-described fiber bundle of which both ends are fixed or the fiber bundle wound onto the roll and the resultant is subsequently heated to melt the thermoplastic resin may be used. More specifically, the film is superimposed on the fiber bundle of which both ends are fixed, and the resultant is heated at a temperature at which the resin is meltable and pressurized. In this case, an apparatus such as a heating roll or a double belt press may be used. In this case, a mold release paper or a mold release film may be used in order to prevent the resin from fusing to the apparatus. Alternatively, a method in which the melted thermoplastic resin is coated on the fiber bundle of which both ends are fixed or the fiber bundles wound onto the roll and solidified may be used. More specifically, layering of the film of the thermoplastic resin is conducted by coating the melted thermoplastic resin on the fiber bundle using a film forming machine prepared by providing a T-die to the tip of an extruder. At this time, an apparatus such as a single-screw extruder or a twin-screw extruder may be used.

The method of manufacturing a carbon fiber-reinforced thermoplastic-resin composite material of the present embodiment is characterized in that these prepregs (I) and (II) are layered in combination. The prepregs (I) and (II) correspond to the above-described layers (I) and (II) of the carbon fiber-reinforced thermoplastic-resin composite material, respectively. In the manufacturing process of a carbon fiber-reinforced thermoplastic-resin composite material, the configuration to layer the prepregs can be determined as desired, and the entire surface may have the same layered configuration or a greater number of the carbon fiber (A) or the carbon fiber (B) may be partly layered. In addition, a method to layer the prepregs consisting of a continuous fiber, a method to layer the prepregs which is slit and used in the molded body to be described later, and a method to dispose the bundles consisting of the prepregs at random are mentioned.

(Molded Body)

The carbon fiber-reinforced thermoplastic-resin composite material of the present embodiment can be used as a molded body. It is possible to design a more efficient structure by disposing the carbon fiber (A) and the carbon fiber (B) according to the required stiffness, strength, and thermal conductivity.

In the method of manufacturing the molded body of the present embodiment, the composite material of the present embodiment is thermoformed to obtain a molded body. The composite material of the present embodiment is thermoplastic, and thus it can be thermoformed if desired. The thermoforming involves heating, shaping, cooling and the like. Examples thereof may include press molding, vacuum molding, pressure molding, or injection molding, but press molding, vacuum molding, or pressure molding is preferable and pressing molding is particularly preferable in order to effectively utilize the elastic modulus, strength and thermal conductivity of the carbon fiber. Heating and pressurizing in molding are conducted, for example, under the conditions of a heating temperature of from 200 to 350° C. and a pressure of from 5 to 30 MPa.

The molded body of the present embodiment is easily molded by the working using heating since the layers (I) and (II) contain a thermoplastic resin. In particular, it is possible to mold a complicated shape by stamping molding. In addition, multi-step molding is possible and the degree of freedom of shape increases as heating, shaping, and cooling are repeated a plurality of times. In the stamping molding, the material of the inner layer that does not come in contact with the mold is likely to flow.

The molded body of the present embodiment has a convex portion having a height of 3 mm or more on the surface of either one side between both sides. Examples of the shape of the convex portion may include a shape such as a rib, a boss, or an elevation, and particularly a shape to be various kinds of structures of the members for the housings of electronic devices is exemplified. The height of 3 mm or more is specifically about from 4 to 8 mm.

In the molded body of the present embodiment, molding is particularly easy, thus it is possible to easily form a large convex portion having a height exceeding 3 mm, and the molded body is particularly advantageous from the viewpoint of manufacturing process or cost.

Figure 2:
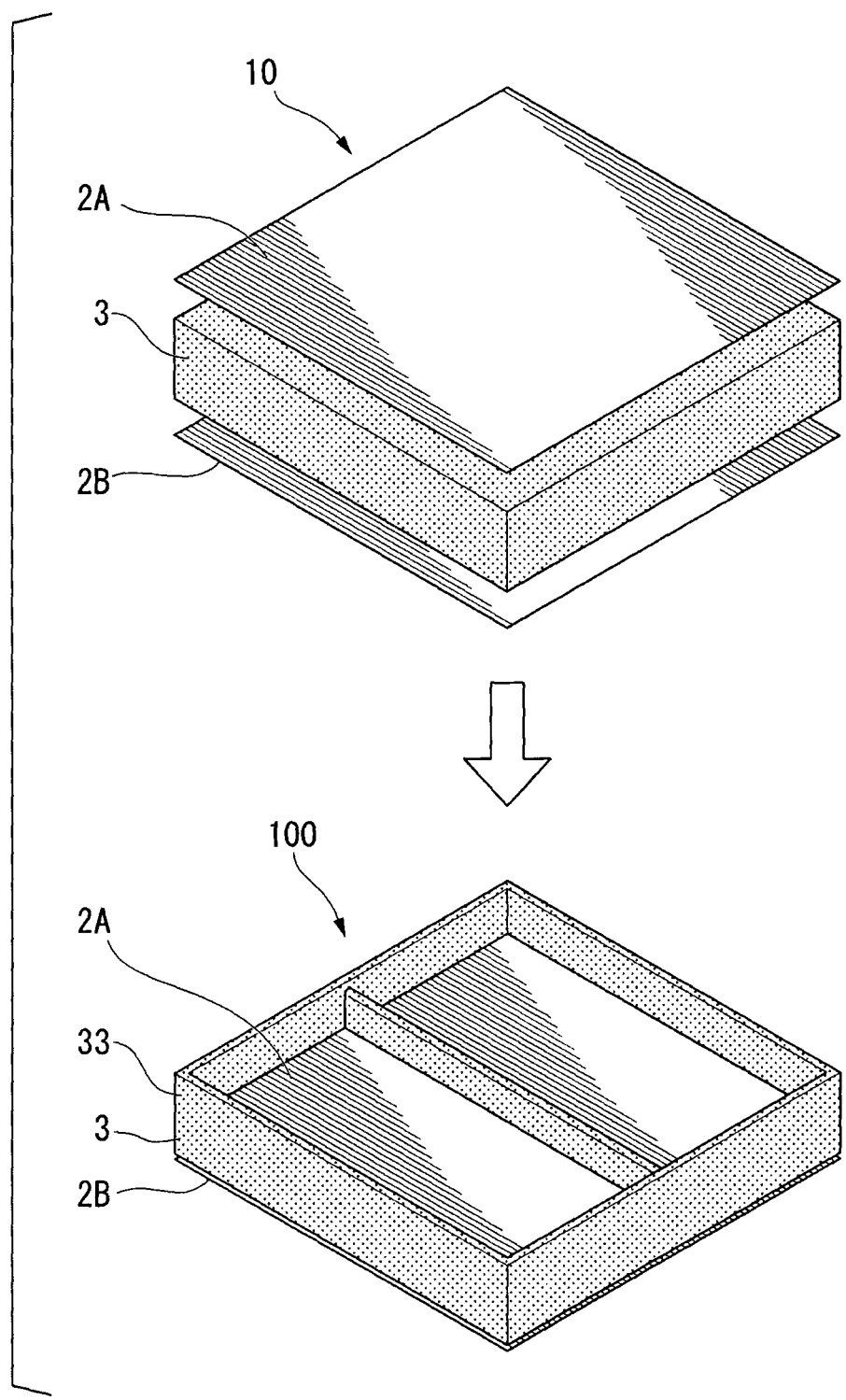
FIG. 2 is a schematic perspective view illustrating a carbon-fiber-reinforced thermoplastic-resin composite material according to an embodiment of the invention and a molded body obtained by molding it.

In the example illustrated in FIG. 2, a carbon-fiber-reinforced thermoplastic-resin composite material 10A including the layer (II) 3 sandwiched between the layers (I) 2A and 2B is molded by thermal processing to obtain a molded body 100. The thermoplastic resin contained in the carbon-fiber-reinforced thermoplastic-resin composite material 10A is deformed and molded by heating and pressurizing to be formed into a convex portion 33 on the molded body 100. Here, the convex portion 33 is formed as the edge of the surface (the upper surface in the drawing) of one side of the molded body 100 and as the ridge to divide the surface into two. In the example illustrated in the drawing, the fiber contained in the convex portion 33 is regarded as being cut short at the time of providing the layer (II) with the slit, and the cross section or surface of the layer (II) containing the fibers is represented as the plane provided with dots, but the convex portion 33 may contain the carbon fiber (B) having any fiber direction. For example, the convex portion 33 may contain a number of carbon fibers (B) along the longitudinal direction of the ridge thereof.

Figure 3:
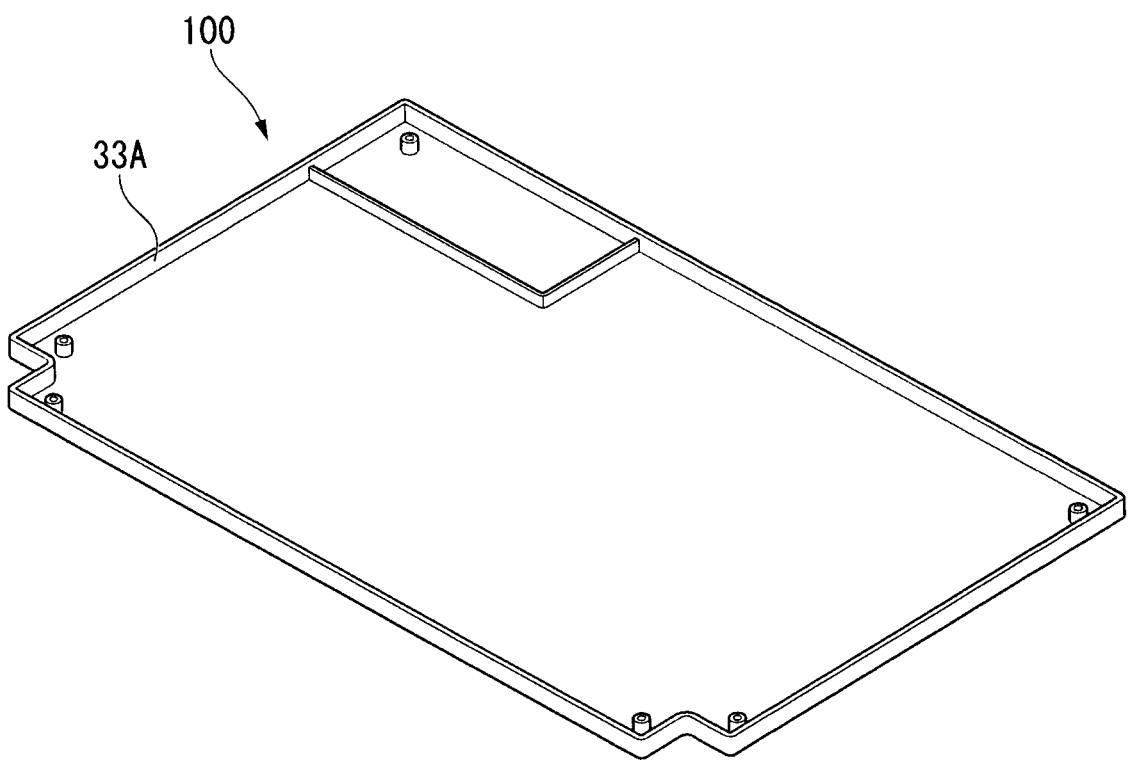
FIG. 3 is a schematic perspective view illustrating an example of a member for electronic device housing according to an embodiment of the invention.

The molded body of the present embodiment can be particularly suitably used in a member for electronic device housing. The electronic device housing is mainly an electronic computer, a personal computer, a tablet and the like, or their peripheral devices and the like, and particularly refers to a housing of a portable device. The member for electronic device housing is a member constituting these housings, and particularly refers to a front panel and the like. The front panel refers to, for example, a panel-like member constituting the part including a planar portion of the outer surface. FIG. 3 illustrates an example of a member for electronic device housing. A member for electronic device housing 100A is one of the surface panels of a personal computer and has the convex portion 33A described above. A boss capable of being screwed is required in order to fix the internal parts to the electronic device housing, and a rib is required in the case of partially increasing stiffness. These shapes are all a convex portion, and it is possible to mold these shapes at the same time in the present embodiment. It is preferable that the member for electronic device housing has a thickness of from 0.5 to 2.5 mm, has a nearly cubic shape which does not have one or more surfaces or has a hole, and has a size consisting of dimensions of from 50 to 250 mm×from 100 to 400 mm×from 5 to 30 mm. The member for electronic device housing can be particularly suitably equipped with all of thermal conductivity, a light reduction effect, elastic modulus, and strength by having these shapes and sizes.

When the molded body of the present embodiment is used in a member for electronic device housing, both the elastic modulus and the strength are achieved in these housings and they are lightweight, and thus the usability is particularly high on carrying of these devices, it is possible to resolve a problem of these devices in which the retention of heat is likely to be a problem due to a high thermal conductivity (heat dissipation), and it is possible to easily perform the replacement of parts when the damage is predicted since the damage can be predicted. The molded body of the present embodiment is particularly effective in the use in a member for electronic device housing by the synergistic effect of these respective effects described above.

EXAMPLES

Hereinafter, the present embodiments will be described in more detail with reference to Examples. Incidentally, the measurement of physical properties and the like were conducted as follows.

(Bending Test)

A molded body was cut into a piece having a length of 100 mm and a width 25 mm in the fiber orientation direction and the three-point bending test was conducted using the cut piece in conformity with ASTM D790.

(Thermal Conductivity)

The thermal conductivity was measured using a sample of 100 mm×100 mm and a measuring apparatus, Quick Thermal Conductivity Meter QTM-500 manufactured by KYOTO ELECTRONICS MANUFACTURING CO., LTD. by a hot wire method. In Examples, the thermal conductivity in 0° direction is a value obtained by disposing a hot wire in a direction orthogonal to the carbon fiber of the surface layer of the sample plate and measuring the thermal conductivity and the thermal conductivity in 90° direction is a value obtained by disposing a hot wire in a direction parallel to the carbon fiber of the surface layer of the sample plate and measuring the thermal conductivity.

Test Example 1

Production Example 1: Method of Manufacturing Prepreg Containing Pitch-Based Carbon Fiber at 56% by Volume A pitch-based carbon fiber (product name: DIALEAD (registered trademark) K63712 manufactured by Mitsubishi Plastics, Inc., basis weight: 2000 mg/m, tensile modulus: 640 GPa, tensile strength: 2600 MPa, breaking elongation: 0.5%, and density: 2.12 g/cm$^3$) as the carbon fiber (A) was pulled and aligned in one direction so as to have a mass (FAW) of the carbon fiber contained per unit area of 218 g/m$^2$, sandwiched between two acid-modified polypropylene films having a thickness of 40 μm to overlap each other, and heated and pressurized at 250° C., thereby manufacturing a sheet-like prepreg (I) containing a carbon fiber at 56% by volume. The thickness of this sheet-like prepreg (I) was 0.18 mm.

Production Example 2: Method of Manufacturing Prepreg Containing Polyacrylonitrile-Based Carbon Fiber at 33% by Volume A polyacrylonitrile-based carbon fiber (product name: PYROFIL (registered trademark) TR50S15L manufactured by Mitsubishi Rayon Co., Ltd., basis weight: 1000 mg/m, tensile modulus: 240 GPa, tensile strength: 4900 MPa, breaking elongation: 2.0%, and density: 1.82 g/cm$^3$) as the carbon fiber (B) was pulled and aligned in one direction so as to have FAW of the carbon fiber contained per unit area of 72 g/m$^2$, sandwiched between two acid-modified polypropylene films having a thickness of 40 μm to overlap each other, and heated and pressurized at 250° C., thereby manufacturing a sheet-like prepreg (II) containing a carbon fiber at 33% by volume. The thickness of this sheet-like prepreg (II) was 0.12 mm.

Example 1: Composite Material Including Pitch-Based Carbon Fiber Prepreg in Outer Layer The prepreg (I) which was obtained in Production Example 1 and contained a pitch-based carbon fiber was disposed at the first layer and the 16$^{th}$ layer and the prepreg (II) which was obtained in Production Example 2 and contained a polyacrylonitrile-based carbon fiber was disposed at from the second layer to the 15$^{th}$ layer to overlap each other such that the direction in which the fiber was pulled and aligned was matched with each other and the prepregs were 16 layers in total, and these prepregs were disposed in the mold. This mold was heated for 3 minutes in a press molding machine set to 220° C., further pressed for 7 minutes at 220° C. and a pressure of 2 MPa, and subsequently pressed for 3 minutes at 30° C. and a pressure of 2 MPa, thereby obtaining a composite material having a thickness of 1.9 mm.

The measurement results of the bending test and the thermal conductivity are presented in Table 1.

Example 2: Composite Material Including Pitch-Based Carbon Fiber Prepreg in Inner Layer A composite material having a thickness of 1.9 mm was obtained in the same manner as in Example 1 except that the prepreg (I) which was obtained in Production Example 1 and contained a pitch-based carbon fiber was disposed at the second layer and the 15$^{th}$ layer and the prepreg (II) which was obtained in Production Example 2 and contained a polyacrylonitrile-based carbon fiber was disposed at the first layer, from the third layer to the 14$^{th}$ layer, and the 16$^{th}$ layer.

The measurement results of the bending test and the thermal conductivity are presented in Table 1.

Comparative Example 1: Composite Material Consisting Only of Polyacrylonitrile-Based Carbon Fiber Prepreg A composite material having a thickness of 1.9 mm was obtained in the same manner as in Example 1 except that the prepreg (I) which was obtained in Production Example 1 and contained a pitch-based carbon fiber was not used but the prepreg (II) which was obtained in Production Example 2 and contained a polyacrylonitrile-based carbon fiber was disposed at from the first layer to the 16$^{th}$ layer. The measurement results of the bending test and the thermal conductivity are presented in Table 1.

TABLE 1

| Layer | Example 1 | Example 2 | Comparative Example 1 |
|---|---|---|---|
| 1 | Pitch-based | Polyacrylonitrile-based | Polyacrylonitrile-based |
| 2 | Polyacrylonitrile-based | Pitch-based | Polyacrylonitrile-based |
| 3 to 14 | Polyacrylonitrile-based | Polyacrylonitrile-based | Polyacrylonitrile-based |
| 15 | Polyacrylonitrile-based | Pitch-based | Polyacrylonitrile-based |
| 16 | Pitch-based | Polyacrylonitrile-based | Polyacrylonitrile-based |
| Flexural modulus (GPa) | 155.2 | 132.3 | 66.3 |
| Flexural strength (MPa) | 677 | 628 | 662 |
| 0° thermal conductivity (W/mK) | 9.5 | 8.6 | 1.7 |
| 90° thermal conductivity (W/mK) | 0.6 | 0.6 | 0.4 |

In the composite materials of the present embodiment described in Examples 1 and 2, a pitch-based carbon fiber having a high elastic modulus as the carbon fibers (A) and a polyacrylonitrile-based carbon fiber having a high strength as the carbon fiber (B) are concurrently used, and thus a high flexural modulus and a high flexural strength are exhibited. In Comparative Example 1, a pitch-based carbon fiber is not used, and thus the composite material is inferior in the flexural modulus. The thermal conductivity is greatly improved in Examples 1 and 2 including a layer of a pitch-based carbon fiber compared to Comparative Example 2 in which a pitch-based carbon fiber is not used. In particular, more favorable value was obtained in Example 1 in which a pitch-based carbon fiber is used in both surface layers. From these results, it has been indicated that the thermal conductivity, namely, heat dissipation is favorable in the present Example.

Test Example 2

Production Example 3: Method of Manufacturing Prepreg Containing Pitch-Based Carbon Fiber at 45% by Volume A pitch-based carbon fiber (product name: DIALEAD (registered trademark) K13312 manufactured by Mitsubishi Plastics, Inc., basis weight: 1560 mg/m, tensile modulus: 420 GPa, tensile strength: 3200 MPa, breaking elongation: 0.8%, and density: 2.06 g/cm$^3$) as the carbon fiber (A) was pulled and aligned in one direction so as to have a mass (FAW) of the carbon fiber contained per unit area of 100 g/m$^2$, sandwiched between two polycarbonate films (one obtained by kneading a phosphorus-based flame retardant with a polycarbonate resin and then forming into a film) having a thickness of 30 µm to overlap each other, and heated and pressurized at 280° C., thereby manufacturing a sheet-like prepreg (I) containing a carbon fiber at 45% by volume. The thickness of this sheet-like prepreg (I) was 0.12 mm.

Production Example 4: Method of Manufacturing Prepreg Containing Polyacrylonitrile-Based Carbon Fiber at 48% by Volume A sheet-like prepreg (II) containing a carbon fiber at 48% by volume was manufactured in the same manner as in Production Example 3 except that a polyacrylonitrile-based carbon fiber (product name: PYROFIL (registered trademark) TR50S15L manufactured by Mitsubishi Rayon Co., Ltd., basis weight: 1000 mg/m, tensile modulus: 240 GPa, tensile strength: 4900 MPa, breaking elongation: 2.0%, and density: 1.82 g/cm$^3$) as the carbon fiber (B) was pulled and aligned in one direction so as to have FAW of 100 g/m$^2$. The thickness of this sheet-like prepreg (II) was 0.12 mm.

Examples 3 and 4 and Comparative Examples 2 and 3 were fabricated in the same manner as in Example 1 except that for each layer, the carbon fiber used was changed to those presented in the following Table 2, the prepregs manufactured in Production Example 3 and Production Example 4 were used, and the prepregs were heated for 3 minutes in a press molding machine set to 250° C., further pressed for 7 minutes at 250° C. and a pressure of 2 MPa, and subsequently pressed for 3 minutes at 80° C. and a pressure of 2 MPa. The configuration [0]$_{16}$ indicates that it is a layered configuration and the direction of the carbon fiber in each of the 16 layers is 0° (parallel). For each of Examples and Comparative Examples, the flexural modulus (0°) and the flexural strength)(0° were measured in the same manner as in Test Example 1, and the results obtained by converting the measured value to the value in the case of having a carbon fiber content of 60% by volume are presented in Table 2.

TABLE 2

| | Example 3 | Example 4 | Comparative Example 2 | Comparative Example 3 |
|---|---|---|---|---|
| Layers 1 and 16 | K13312 | TR50S | TR50S | K13312 |
| Layers 2 and 15 | TR50S | K13312 | TR50S | K13312 |
| Layers 3 to 14 | TR50S | TR50S | TR50S | K13312 |
| Configuration | [0]16 | [0]16 | [0]16 | [0]16 |
| 0° flexural modulus | 146 GPa | 123 GPa | 111 GPa | 145 GPa |
| 0° flexural strength | 1390 MPa | 1168 MPa | 1265 MPa | 599 MPa |

From the above results, it was confirmed that the composite material was excellent in balance between elastic modulus and strength even when a polycarbonate resin was used as presented in Examples 3 and 4 in the same manner as in the case of using an acid-modified polypropylene presented in Examples 1 and 2. On the other hand, the flexural modulus was low in Comparative Example 3 using only a polyacrylonitrile-based carbon fiber, the flexural strength was lowered in Comparative Example 4 using only a pitch-based carbon fiber, and thus a balance achieving both the elastic modulus and the strength to the extent of Examples 3 and 4 was not obtained.

Test Example 3

Example 5 and 6 and Comparative Examples 4 and 5 were fabricated under the conditions presented in Table 3. The Vf45% indicates that the volume content of the carbon fiber is 45%. The 45° slit indicates that a slit (the length of individual slits is 42 mm, and the sum of the slit lengths with respect to 5 cm×5 cm of the prepreg (II) is 14 cm on average) to be at approximately 45° to the fiber direction of the carbon fiber in each of the layers (II) is disposed in the layers (II) of the inner layers (second to 15$^{th}$ layers). The [0/90/90/90]s of the configuration indicates that all of the inner layers consisting of six layers have a fiber direction at 90° (orthogonal) to the outermost layer (0°), and the [0/90/90/90]s indicates that the first inner layer has a fiber direction at 90° to the outermost layer, subsequently the second inner layer has a fiber direction (namely, 0°) at 90° to the first inner layer, subsequently the third inner layer has a fiber direction (namely, 90°) at 90° to the second inner layer, subsequently the fourth inner layer is parallel (namely, 90°) to the third inner layer, subsequently the fifth inner layer has a fiber direction (namely, 0°) at 90° to the fourth inner layer, subsequently the sixth inner layer has a fiber direction (namely, 90°) at 90° to the fifth inner layer, subsequently the layer which has a fiber direction (namely, 0°) at 90° to the sixth inner layer is adopted as the outermost layer of the opposite side. Incidentally, the flexural modulus of Comparative Examples 4 and 5 in which only a carbon fiber is used singly is a value estimated from the performance value of each carbon fiber. The equivalent stiffness thickness t (mm) was determined as a ratio to the value of Comparative Example 4 as a standard (1.000 mm). The deformation amount was calculated by completely constraining the periphery of the specimen of 200 mm×300 mm×1 mm, applying a load of 10 N to the center, and using 2 GPa for the shear modulus and 0.3 for the Poisson's ratio, respectively.

TABLE 3

|  | Example 5 | Comparative Example 4 | Comparative Example 5 | Example 6 |
|---|---|---|---|---|
| Outermost layer | K13312 | TR50S | K13312 | K13312 |
|  | Vf45% | Vf48% | Vf45% | Vf45% |
| Inner layer | TR50S | TR50S | K13312 | TR50S |
|  | Vf48% | Vf48% | Vf45% | Vf48% |
|  | 45° slit | 45° slit | 45° slit | 45° slit |
| Configuration | [0/90/90/90]s | [0/90/90/90]s | [0/90/90/90]s | [0/90/0/90]s |
| 0° flexural modulus | 75 GPa | About 58 GPa | About 76 GPa | 88 GPa |
| 90° flexural modulus | 24 GPa | About 22 GPa | About 29 GPa | 16 GPa |
| 0° flexural strength | 156 MPa | — | — | 309 MPa |
| 90° flexural strength | 238 MPa | — | — | 120 MPa |
| Density (g/cm³) | 1.52 | 1.50 | 1.59 | 1.52 |
| Deformation amount (mm) | 0.721 | 0.880 | 0.676 | 0.723 |
| Equivalent stiffness thickness t (mm) | 0.936 | 1.000 | 0.916 | 0.937 |
| Equivalent stiffness weight (g) | 91.1 | 96.0 | 93.2 | 91.2 |

As presented in Table 3, in both Examples 5 and 6, the equivalent stiffness weight is 92 g that is a favorable value, and thus it is indicated that the effect of weight reduction is great.

INDUSTRIAL APPLICABILITY

According to the invention, it is possible to obtain a molded body excellent in balance among stiffness, strength, and thermal conductivity in a short molding time.

EXPLANATIONS OF LETTERS OR NUMERALS 1 and 10 Carbon fiber-reinforced thermoplastic-resin composite material
2A and 2B Layer (I)
3 Layer (II)
21, 31A, and 31B Carbon fiber
32 Slit
33 and 33A Convex portion
100 Molded body
100A Member for electronic device housing

The invention claimed is:

1. A carbon-fiber-reinforced thermoplastic-resin composite material, comprising:
    a first layer comprising a first carbon fiber aligned in one direction and a first thermoplastic resin; and
    a second layer comprising a second carbon fiber aligned in one direction and a second thermoplastic resin,
    wherein the first carbon fiber has a higher elastic modulus than the second carbon fiber,
    wherein the first carbon fiber is a continuous carbon fiber and an average fiber length of the second aligned carbon fiber is from 10 to 50 mm;
    wherein the first layer accounts for ⅓ or more of a thickness for each region which accounts for 10% of a total thickness of the carbon-fiber-reinforced thermoplastic-resin composite material from surfaces of both sides of the carbon-fiber-reinforced thermoplastic-resin composite material,
    wherein two or more layers of the second layer are sandwiched between at least two layers of the first layer, and
    wherein the first layer is not sandwiched between at least two layers of the second layer.

2. The carbon-fiber-reinforced thermoplastic-resin composite material according to claim 1,
    wherein an elastic modulus of the first carbon fiber is 350 GPa or more and
    an elastic modulus of the second carbon fiber is 200 GPa or more and less than 350 GPa.

3. The carbon-fiber-reinforced thermoplastic-resin composite material according to claim 1,
    wherein the first layer accounts for ⅓ or less of the thickness of the carbon-fiber-reinforced thermoplastic-resin composite material.

4. The carbon-fiber-reinforced thermoplastic-resin composite material according to claim 1, wherein the second carbon fiber is a polyacrylonitrile-based carbon fiber.

5. The carbon-fiber-reinforced thermoplastic-resin composite material according to claim 1,
wherein the first carbon fiber is a pitch-based carbon fiber.

6. The carbon-fiber-reinforced thermoplastic-resin composite material according to claim 1,
wherein the first carbon fiber is a pitch-based carbon fiber and
the second carbon fiber is a polyacrylonitrile-based carbon fiber.

7. The carbon-fiber-reinforced thermoplastic-resin composite material according to claim 1,
wherein a thickness of the first layer is from 0.1 to 0.3 mm.

8. The carbon-fiber-reinforced thermoplastic-resin composite material according to claim 1,
wherein a thermal conductivity of the first carbon fiber is 20 W/mK or more and 600 W/mK or less and
a thermal conductivity of the second carbon fiber is 3 W/mK or more and less than 20 W/mK.

9. The carbon-fiber-reinforced thermoplastic-resin composite material according to claim 1,
wherein an elastic modulus after applying a load corresponding to 70% of the maximum load to the carbon-fiber-reinforced thermoplastic-resin composite material is from 20 to 60% of an elastic modulus before applying the load in a three-point bending test.

10. The carbon-fiber-reinforced thermoplastic-resin composite material according to claim 1,
wherein an equivalent stiffness weight that is a weight of a sample plate having a size of 200 mm×320 mm when a shift of a region to which a load of 10 N is applied in the case of applying the load to a substantially central portion of the sample plate is 0.88 mm is from 80 to 92 g.

11. The carbon-fiber-reinforced thermoplastic-resin composite material according to claim 1,
wherein the first layer and the second layer are overlapped, and
fiber directions of carbon fibers contained in respective two layers consisting of the first layer and the second layer which are directly overlapped are substantially orthogonal to each other.

12. A molded body obtained by thermoforming the carbon-fiber-reinforced thermoplastic-resin composite material according to claim 1.

13. The molded body according to claim 12, comprising a convex portion having a height of 3 mm or more on a surface of either side.

14. A member for electronic device housing comprising the molded body according to claim 12.

15. The carbon-fiber-reinforced thermoplastic-resin composite material according to claim 1, wherein a content proportion of the carbon fiber contained in the second layer is from 25 to 48% by volume, and
wherein a content proportion of the carbon fiber contained in the first layer is from 33 to 56% by volume.

16. The carbon-fiber-reinforced thermoplastic-resin composite material according to claim 1, wherein the thermoplastic-resin is acid-modified polypropylene.

17. The carbon-fiber-reinforced thermoplastic-resin composite material according to claim 1, wherein the first layer further comprising phosphorus-based flame retardant.

18. The carbon-fiber-reinforced thermoplastic-resin composite material according to claim 1, wherein the content proportion of the carbon fiber contained in the second layer is from 25 to 33% by volume.

* * * * *